June 27, 1972   W. H. HORTON   3,672,813
ADAPTER FOR IGNITING ELECTRICALLY IGNITABLE FLASHLAMPS
Filed Feb. 6, 1970   3 Sheets-Sheet 1

WILLIAM H. HORTON
*INVENTOR.*

BY

ATTORNEYS

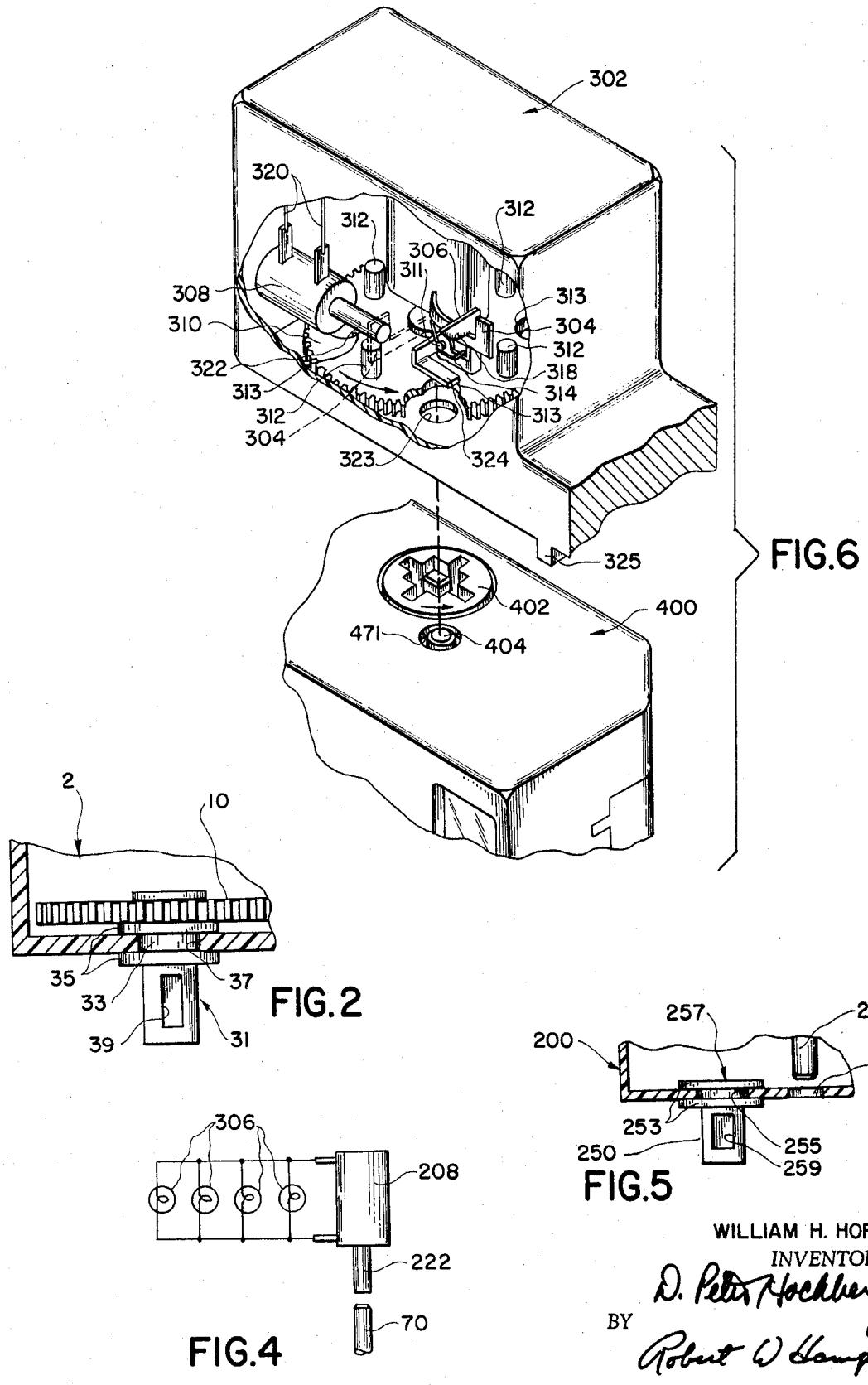

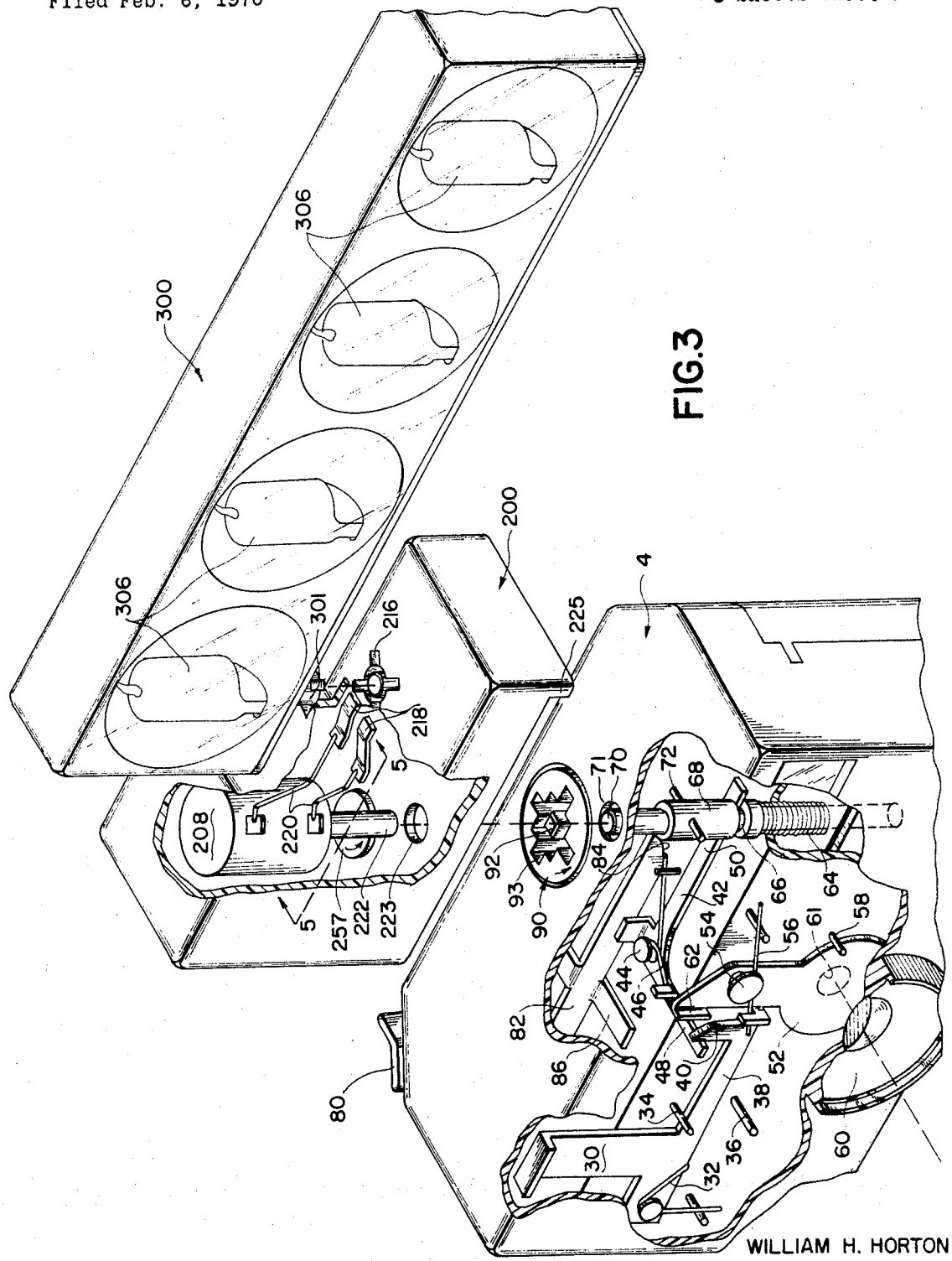

United States Patent Office 3,672,813
Patented June 27, 1972

3,672,813
ADAPTER FOR IGNITING ELECTRICALLY IGNITABLE FLASHLAMPS
William H. Horton, Rochester, N.Y., assignor to Eastman Kodak Company, Rochester, N.Y.
Filed Feb. 6, 1970, Ser. No. 9,209
Int. Cl. F21k 5/02
U.S. Cl. 431—95                         4 Claims

ABSTRACT OF THE DISCLOSURE

An adapter for enabling a percussion flash camera to receive and actuate electrically ignitable flashlamps. The adapter includes a piezoelectric device for generating flashlamp ignition voltage in response to operation of the camera flash actuating means. The actuating means can strike the piezoelectric device directly, or release a percussive element for striking the device. In one embodiment, the adapter has a rotatable socket for receiving a conventional multilamp flash holder and for sequentially presenting a fresh flashlamp in a firing position in response to the actuation of camera indexing means. In another embodiment, the adapter receives a multilamp flash unit having a linear array of electrically ignitable flashlamps.

BACKGROUND OF THE INVENTION

Field of the invention

The present invention relates to adapters for enabling percussion flash photographic apparatus to receive and fire electrically ignitable flashlamps.

Description of the prior art

Percussion-ignitable photoflash units have recently been developed in order to obviate certain disadvantages of battery operated photoflash systems. Two classifications of such percussion-ignitable flash units are those having an energized percussion striker element which is released by an impact mechanism in photographic apparatus, and those which utilize a percussion striker element provided in the photographic apparatus itself. U.S. Pat. No. 3,596,-581 discloses a flash unit and apparatus of the former type, while U.S. Pat. No. 3,584,554 discloses a flash unit of the latter type. A feature common to both types of apparatus is the utilization of an impact mechanism for actuating the percussion ignition sequence.

SUMMARY OF THE INVENTION

The present invention provides an adapter for converting percussion flash photographic apparatus into the type which receives and fires electric flashlamps. The adapter contains a piezoelectric device which generates electricity for firing electric flashlamps mounted on the adapter. The adapter is mounted on the socket of the percussion flash photographic apparatus so that, in response to actuation of the percussion flash operating means, the piezoelectric device generates voltage to ignite an electric flashlamp on the adapter. The adapter, according to one embodiment, receives flashcubes having electric flashlamps thereon, and is provided with means for indexing the flashcube to place a fresh flashlamp in firing position to effect flash exposures. According to another embodiment, the adapter receives a multilamp flash unit having electric flashlamps mounted in a linear arrangement, wherein rotation of the unit is unnecessary.

Accordingly, an object of the present invention is to provide an apparatus for adapting percussion-ignition flash cameras to receive and fire electrically ignitable flashlamps.

A more specific object is the provision of such an adapter for receiving flashcubes, and a related object is the provision of such an adapter for receiving a multilamp flash unit having electrically ignitable flashlamps mounted in a linear arrangement.

Another object of the invention is the provision of an adapter for enabling a percussion flash photographic apparatus to receive and actuate electrically operative flash units which is economical to manufacture, and easy to use.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 is a partial enlarged section view taken through the line 2—2 of FIG. 1 and indicates the means by which the adapter shown in FIG. 1 is coupled to the camera;

FIG. 3 is a pictorial of another embodiment of an adapter according to the invention, and shows a holder, having a number of linearly arranged electric flashlamps carried thereby, in position for mounting on the adapter. The adapter is oriented for attachment to a percussion flash camera, and portions of the adapter and camera are cut away to aid in the understanding of the components and operation of the embodiment of the invention;

FIG. 4 is an electric circuit diagram of the device shown in FIG. 3;

FIG. 5 is a partial section view taken through the line 5—5 in FIG. 3, and indicates the means by which the embodiment depicted in FIG. 3 is coupled to the camera; and FIG. 6 is a perspective of another embodiment of the invention, with portions cut away to reveal interior components thereof.

DETAILED DESCRIPTION OF THE INVENTION

Figure 1:
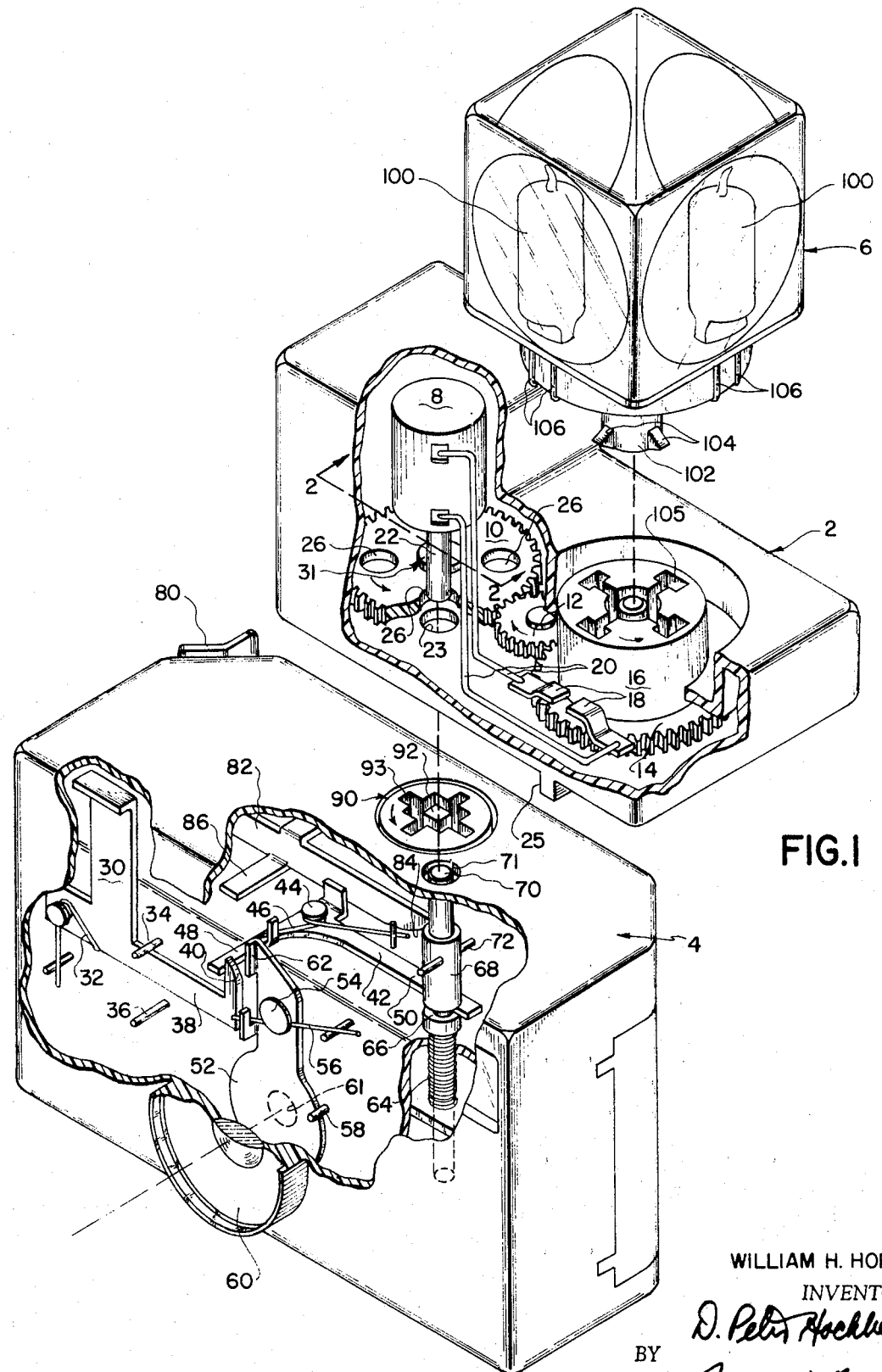
FIG. 1 is a pictorial view of an adapter according to one embodiment of the invention, positioned for mounting on a percussion flash camera. Portions of the camera and of the adapter are removed to reveal the working components of the embodiment.

Because cameras are well known, the present description will be directed in particular to camera elements forming part of, or cooperating more directly with, apparatus in accordance with the present invention. It is to be understood that camera elements not specifically shown or described may take various forms well known to those skilled in the art.

Referring first to FIG. 1, an adapter 2 is positioned to be mounted on a percussion flash camera 4, and a flashcube 6, comprising a plurality of electrically ignitable flashlamps 100, is in turn positioned for insertion in adapter 2. Camera 4 has means for automatically indexing a flashcube of the percussion type mounted in a socket 90, and the indexing mechanism of the camera is used to index flashcube 6 mounted on adapter 2. Adapter 2 comprises a piezoelectric device 8, a gear train comprising gears 10, 12 and 14, a rotatable socket 16 secured to gear 14, and electric contacts 18 electrically connected to piezoelectric device 8 by means of wires 20. Piezoelectric device 8 has a portion 22 extending therefrom, which, when struck with sufficient force by the percussive element of camera 4, generates sufficient electricity to fire a flashlamp on flashcube 6. Gear 10 has four holes 26 disposed at 90° intervals about the face of the gear and extending therethrough. One of holes 26 is axially aligned with an aperture 23 extending through adapter 2, and it can be seen that holes 26 will sequentially align with aperture 23 as gear 10 is rotated in 90° increments about its axis of rotation. Depending from the base of adapter 2 is an extension 25 for engaging the wall of a camera on which the adapter is mounted, to prevent rotation of the adapter on the camera, and to aid in positioning the adapter on the camera when mounting the adapter thereon.

As shown in FIG. 2, adapter 2 further includes a post 31 keyed in the center of gear 10, for imparting rotation to the adapter gear train. Post 31 includes a journal 33 located between flanges 35, by means of which post 31 is mounted for rotation in bearing aperture 37 in the base of adapter 2. Post 31 extends downwardly from adapter 2 and includes recesses 39 disposed at 90° intervals and extending radially inward, and contoured to receive retaining fingers (not shown) when post 31 is inserted into a camera socket 90 to be described below. The center of post 31 is hollow and designed to receive a post 92 of the camera socket. It can be seen that post 31 is receivable by camera flashcube socket 90 in much the same manner as a flashcube. Adapter 2 is attached to camera 4 by aligning the inner surface of extension 25 with the camera wall and inserting post 31 in socket 90, thereby aligning aperture 23 in the base of the adapter with a corresponding aperture 71 in the top of camera 4 as shown, for reasons to be set forth below.

Camera 4 contains a shutter release lever 30 which is biased upwardly by a spring 32, and is movable between stops 34, 36. The lever 30 has an extension 38 from which a finger 40 extends upwardly. An L-shaped member 42 is rotatably mounted on pivot 44, and is biased in a counterclockwise direction by a spring 46. One leg 48 of member 42 is shown in its initial position in engagement with finger 40, so that member 42 is prevented from rotating about pivot 44. The other leg 50 of member 42 serves to release the percussion element of the camera in a manner to be described subsequently. A pendulous shutter 52 is rotatably mounted on a pivot 54 and biased in a counterclockwise direction by spring 56. The counterclockwise movement of shutter 52 is limited by a stop 58. Shutter 52 is shown in its cocked position lying in the optical path of the camera lens 60 so as to close the camera aperture 61. Shutter 52 has an ear 62 on a portion of the shutter extending above pivot 54. It may be seen that, upon counterclockwise rotation of member 42, leg 48 will contact ear 62 to open the shutter.

Camera 4 is of the type which utilizes a striker element provided in the camera itself. The percussion flash components of camera 4 comprise a coil spring 64, shown in a compressed position and restrained from extension along a post 66 by leg 50 of member 42, and a percussion element having a base portion 68 and a forward portion 70, the latter being in axial alignment with aperture 71. Lugs 72 extend from base 68 and comprise the means by which spring 64 is cocked.

Camera 4 further comprises a film advance lever 80 which is moved across the camera back in a known fashion to advance film in the camera. Coupled to the film advance mechanism (not shown) is a member 82 which has a cam surface 84 engageable with lug 72 on the percussion element to urge the element downwardly to cock spring 64, and an extension 86 for cocking spring 46. It can be seen that operation of film advance lever 80 also serves to reset the shutter and percussion components of the camera.

Socket 90, having a center post 92 and recesses 93, is located on the top of camera 4 and is designed to receive flashcubes carrying percussion type flashlamps. Socket 90 is rotatable in response to actuation of camera elements (not shown) for indexing flashcubes mounted on the camera. It is assumed, although not required, that camera 4 has means for automatically rotating socket 90 with each operation of the shutter. Alternatively, camera 4 could include means for automatically rotating socket 90 with each operation of the film advance mechanism.

Flashcube 6 comprises electric flashlamps 100, a base 102 having a set of extensions 104 which mate with corresponding configurations in recesses 105 of socket 16 to secure the flashcube on the adapter. A pair of contacts 106 is provided for each flashlamp and, upon insertion of the flashcube into socket 16, one pair of contacts 106 engages electric contact 18 electrically connected to piezoelectric device 8. As the flashcube is indexed, a pair of contacts 106, which operate a forward facing flashlamp 100, engage contacts 18.

In the following explanation of the operation of this embodiment of the invention, it is assumed that all components of camera 4 are cocked, and an exposure is about to be made. When shutter release lever 30 is depressed, finger 40 becomes disengaged from leg 48 of member 42, and member 42 rotates in a counterclockwise direction under the influence of spring 46. Substantially simultaneously, leg 48 strikes ear 62 of shutter 52, and leg 50 releases spring 64. The force of spring 46 drives leg 48 into ear 62, causing the shutter to pivot in a clockwise direction to open the exposure aperture. The force exerted by leg 48 on shutter 52 is strong enough to overcome the opposing force exerted by spring 56 on shutter 52. While the shutter is thus opening, spring 64 drives the percussion element upwardly, and portion 70 of the percussion element moves through aperture 71, and aperture 23 and hole 26 in adapter 2 to strike extension 22 of piezoelectric device 8. At about the same time that the exposure aperture is fully opened due to the clockwise movement of shutter 52, the piezoelectric device generates current which is transferred through contacts 18 to the flashlamp 100 facing the forward direction, thereby firing the lamp. A maximum opening of the camera shutter 52 should correspond with the maximum output of flashlamp 100. The exposure sequence is completed when spring 56 drives shutter 52 counterclockwise against stop 58 to close the exposure aperture. Upon release of shutter release 30, spring 32 urges lever 30 into its initial position.

If camera 4 is of the type which automatically indexes the flashcube normally mounted thereon each time an exposure is made, socket 90 rotates with each actuation of shutter release 30. As indicated by the directional arrows, the adapter gear train is arranged so that upon each actuation of shutter release 30 and the resulting 90° rotation of socket 90, gear 10 rotates 90° to align a hole 26 with aperture 23, and gear 14 similarly rotates 90°, carrying with it flashcube socket 16. Thus, with each exposure, flashcub 6 rotates 90° to present a new flashlamp in position for making the next flash exposure. The gear train shown could be replaced by a suitable linkage for accomplishing the indexing function. Of course, an electric flashcube in socket 16 could be manually indexed in the adapter shown even if automatic indexing were not provided in camera 4. Means (not shown) may be provided for indicating when all of the flashlamps have been fired.

According to another embodiment of the invention, an adapter for enabling a percussion photoflash apparatus to take a flash holder having a series of electric flashlamps mounted in a linear arrangement thereon is provided. The embodiment contemplates, inter alia, a flashbulb device such as is disclosed in British Pat. 1,154,807, published June 11, 1969 by Philips Electronic and Associated Industries Ltd., London, England. That device comprises a holder for electric flashlamps which are connected in parallel and which require increasing voltages for their sequential ignition. When sufficient voltage is impressed across the lamps, that bulb with the lowest voltage ignites first. The lamps are ignited in order according to their ignition voltage. When such a multi-lamp flash apparatus is employed, rotation of the device to present fresh lamps to illuminate the photographic subject is made unnecessary. An adapter according to the present invention permits the use of such device on a percussion photoflash camera.

The camera shown in FIG. 3 is identical to that shown in FIG. 1, and reference is made to the preceding description for an explanation of the parts and operation thereof. The adapter 200 is similar to adapter 2 in FIG. 1, but is somewhat modified to prevent rotation of the flash unit mounted thereon. Adapter 200 has a piezoelectric device 208 having a portion 222 extending from the bottom portion thereof and in alignment with an aperture 223 in the base of the adapter, through which a percussion element 70 can enter to strike the extension. Adapter 200 further comprises a pair of contacts 218 electrically connected to piezoelectric device 208 by means of electric wires 220, and a socket 216 for receiving a base 301 of an electric flashlamp holder 300. Flashlamp holder 300 is of a type disclosed in the above-mentioned British patent, and shown ready for mounting on adapter 200. The flashlamp holder comprises a plurality of electric flashlamps 306 connected in parallel as indicated in FIG. 4. The ignition voltages of the various lamps increase from lamp to lamp, so that upon impression of sufficient voltage across the lamps, they will fire in sequence as mentioned above. When flashlamp holder 300 is inserted into socket 216, contacts 206 engage contacts 218.

It can be seen that indexing of such a flashlamp apparatus is unnecessary and must be dispensed with. Since camera 4 is adapted to index automatically a flashcube mounted thereon by the automatic rotation of socket 90, a slip clutch 250 is provided as shown in FIG. 5, for rendering the rotation of socket 90 ineffectual. Slip clutch 250 comprises a journal 251 located between flanges 253 for rotation in bearing aperture 255 in the base of adapter 200, and a post 257. Post 257 has four recesses 259 contoured to receive retaining fingers (not shown) upon insertion of post 257 in socket 90, and a hollow center portion (not shown) for receiving post 92. Of course, if camera 4 is not of the type which automatically indexes the photoflash unit mounted thereon, slip clutch 250 is unnecessary. An extension 225 is provided on an end of adapter 200 to aid in orienting the adapter for mounting it on the camera, and to prevent rotation of the adapter thereafter.

The operation of this second embodiment is similar to the operation of the previously discussed embodiment. Upon actuation of shutter release lever 30, percussion element 70 is driven upwardly through aperture 223 and into engagement with lower extension 222 of piezoelectric device 208. Piezoelectric device 108 generates sufficient voltage to effect ignition of the flashlamp having the lowest ignition voltage. The earlier discussion relating to the relative timing of the ignition of the flashlamp and the opening of the shutter applies here as well. Furthermore, the various movements of the camera components subsequent to the depression of lever 30 are the same as those described in the earlier embodiment.

The adapter illustrated in FIG. 6 of the drawings is intended for use with percussion flash cameras of the type mentioned earlier, wherein an impact mechanism of the camera releases a striker element in a received percussive flash unit for igniting a flashlamp. The adapter components shown are adaptable for receiving and actuating either electrically operable flashcubes, or with holders having electrically ignitable flashbulbs arranged in a linear array, as previously described. The flashbulb holder has been omitted from the drawing, and reference is made to the earlier discussions thereof.

An adapter 302 is shown in position for mounting on camera 400. Adapter 302 includes a post (not shown) of the type previously described, which is insertable in socket 402 for operatively mounting adaptert 302 on the camera, and an extension 325 engageable with an end wall of camera 400, for orienting the adapter and preventing its rotation on the camera.

The pertinent operating components of adapter 302 include piezoelectric device 308, a striker 304 held in a cocked position by a releasable trigger 306, and a rotatable gear 310 having posts 312 extending upwardly therefrom for resetting striker 304. Gear 310 is rotatable in response to rotation of socket 402 as described above, for sequentially displacing post 312 into operating position, and for effecting the indexing of a received flash unit where the adapter is of the type for receiving such a unit. A plurality of holes 313 is provided in gear 310 for sequential alignment with an aperture 323 in the base of adapter 302, for reasons to be set forth.

Camera 400 includes rotatable socket 402 for normally receiving a flashcube having percussive lamps and strikers releasable for actuating the lamps, and an impact member 404 normally displaceable through an aperture 471 in the top of the camera for releasing the striker carried by a received flashcube. For the purposes of this discussion, camera 400 is considered identical to the camera previously described, with the exception that impact member 404 is displaced with less force than the percussion element 70, it being assumed that less force is required to release the pre-energized striker of a percussion flash unit incorporating such strikers than to ignite a percussion flashlamp directly with the camera impact member. Similarly, less force is required to release trigger 306 than to actuate piezoelectric device 308. It is assumed that socket 402 is rotated in response to operation of the camera film advance mechanism (not shown).

Striker 304 comprises a resilient strip of suitable material such as metal or plastic, which when flexed, is impressed with considerable potential energy for urging the striker to its released position. Striker 304 is shown as a cantilever fastened at one end to the adapter housing. Trigger 306 is pivotally mounted on a stud 311, and is biased in a clockwise direction by a spring 314 entwined about stud 311. An ear 316 depends from trigger 306 and is adapted to engage a portion of striker 304 to maintain it in a cocked condition. Trigger 306 further includes a surface 318 contoured to be engaged by the upper edge of striker 304, to raise the trigger out of the way of striker 304 when the striker 304 is reset in its cocked condition, as described below. Also included in the structure of trigger 306 is a leg 324, which is aligned with aperture 323 in the base of the adapter and engageable by impact member 404 for rotating trigger 306 about stud 311.

Piezoelectric device 308 includes a portion 322 extending coaxially with the device towards striker 304. As indicated by the dotted lines in FIG. 3, striker 304 is displaceable from its cocked position into engagement with the end of portion 322. Electrical connections 320 lead from piezoelectric device 308 to the flashbulb contacts (not shown). Of course, striker 304 and piezoelectric device 308 must be selected so that upon their impact, sufficient electricity is generated to ignite the flashbulbs carried by the adapter.

When adapter 302 is properly attached to camera 400, aperture 323 and one hole 313 are in alignment with impact member 404 and aperture 471. After a flashlamp has been ignited, the camera film advance mechanism is actuated thereby rotating socket 402 90°, and the shutter and impact member 404 are cocked. Rotation of socket 402 in turn rotates gear 310 counterclockwise as indicated by the arrow, and a post 312 engages and displaces striker 304 from its released position (shown by the dotted lines) along a path beneath trigger 306. In moving from its released to its cocked position, the upper edge of striker 304 cams trigger 306 upwardly against the bias of spring 314. When striker 304 is moved passed ear 316, trigger 306 is displaced clockwise by spring 314, thereby releasably locking striker 304 in a cocked position. The rotation of gear 310 simultaneously positions a hole 313 in axial alignment with aperture 323 and impact member 404 of the camera. If the adapter is of the type for receiving a rotatable flashcube, the flashcube would normally be indexed as well, as previously discussed.

Upon release of the shutter (not shown), impact member 404 is released from its cocked condition in a manner similar to that in FIGS. 1 and 2. Impact member 404 is thereby driven through aperture 471, aperture 323, and hole 313, and into engagement with leg 324 of trigger 306. Impact member 404 rotates trigger 306 counterclockwise about stud 311, lifting ear 316 from its blocking position, and accordingly releasing striker 304. Striker 304 swings in its clockwise path into abutment with portion 322 of piezoelectric device 308, and the necessary electricity is generated to fire a flashbulb on the adapter.

The invention has been described in detail with particular reference to the preferred embodiments thereof, but it will be understood that variations and modifications can be effected within the spirit and scope of the invention.

I claim:

1. For use with photographic apparatus having means for receiving and actuating percussion ignitable multilamp flash units, and for indexing received units to present fresh flashlamps in a firing position, an adapted for enabling the apparatus to receive and actuate electrically operable multilamp flash units having a plurality of electricity ignitable flashlamps, said adapter comprising:
    piezoelectric means for generating electricity in response to operation of the actuating means;
    a displaceable socket for receiving said electrically operable multilamp flash unit, and having a firing position;
    means electrically connecting said piezoelectric means to said firing position for connecting a flashlamp in said firing position to said piezoelectric means; and
    means for coupling said socket with said indexing means, and for controlling the displacement of said socket to present a fresh flashlamp in firing position in response to actuation of said indexing means.

2. An adapter according to claim 1 wherein the photographic apparatus receiving, actuating, and indexing means includes a rotatable second socket, and said coupling and socket displacement controlling means comprises:
    a post insertable in said second socket and rotatable therewith; and
    means interconnecting said post and said adapter socket for effecting the rotation of said adapter socket by amounts equal to the angular displacement of said second socket.

3. For use with photographic apparatus having means for receiving and actuating percussion ignitable multilamp flash units, and means for indexing a received unit to present fresh lamps in a firing position, an adapter for enabling said apparatus to receive and actuate electrically ignitable flashlamps facing one direction and carried by a multilamp flash unit, said adapter comprising:
    piezoelectric means for generating electricity to fire a received electrically ignitable flashlamp in response to operation of said actuating means;
    a stationary socket for receiving said multilamp flash unit;
    means electrically connecting said piezoelectric means with said socket to connect said received multilamp flash unit with said piezoelectric means; and
    means for coupling said indexing means with said adapter, and for rendering said indexing means ineffectual.

4. An adapter for use with a camera of the type having a socket for receiving a flash unit, means defining a camera aperture adjacent to the socket and a member movable through the camera aperture to apply a mechanical force to a received flash unit; said adapter comprising:
    a socket for receiving an electrically ignitable flash unit;
    piezoelectric means for generating electrical energy in response to receipt of a mechanical force;
    means electrically connecting said piezoelectric means to a received flash unit for applying generated electrical energy to a received flash unit;
    means for applying a mechanical force to said piezoelectric means, said force applying means including a striker having an energized position from which it is releasable to apply such a force to said piezoelectric means, and means for releasably holding said striker in its energized position, and said force applying means including a release surface for receiving a mechanical force to release said striker from its energized position;
    a housing having means defining an adapter aperture aligned with said release surface; and
    coupling means for removably connecting said adapter to a camera of the type described and for aligning the camera aperture with said adapter aperture and the camera force applying member with said release surface to convert the camera from one applying a mechanical force to a received flash unit to one applying electrical energy to a received flash unit.

References Cited
UNITED STATES PATENTS

| 3,211,069 | 10/1965 | Rixton | 95—11.5 |
| 3,528,354 | 9/1970 | Nakagawa | 95—11.5 |
| 2,972,937 | 2/1961 | Suits | 431—95 UX |
| 3,500,732 | 3/1970 | Nijland | 431—95 X |

EDWARD J. MICHAEL, Primary Examiner

U.S. Cl. X.R.

95—11.5